United States Patent [19]

Miyazaki et al.

[11] Patent Number: 5,412,927
[45] Date of Patent: May 9, 1995

[54] LONGITUDINAL BAG-MAKING, FILLING AND PACKAGING MACHINE

[75] Inventors: Kiyoshi Miyazaki, Tokyo; Tomoyuki Wakai, Saitama; Akira Isosaka, Saitama; Yoshirou Watanabe, Saitama; Yukio Koyano, Saitama, all of Japan

[73] Assignee: Kawashimaseisakusyo Co., Ltd., Saitama, Japan

[21] Appl. No.: 154,609

[22] Filed: Nov. 18, 1993

[51] Int. Cl.⁶ .................. B65B 9/20; B65B 51/26; B65B 51/30
[52] U.S. Cl. ..................................... 53/552; 53/374.3; 53/374.6
[58] Field of Search .................. 53/51, 551, 552, 374.3, 53/374.6

[56] References Cited

U.S. PATENT DOCUMENTS

| | | | |
|---|---|---|---|
| 3,738,080 | 6/1973 | Reil | 53/551 |
| 4,128,985 | 12/1978 | Simmons | 53/551 X |
| 4,506,494 | 3/1985 | Shimoyama et al. | 53/551 |
| 4,563,862 | 1/1986 | McElvy | 53/552 |
| 4,637,200 | 1/1987 | Shibata et al. | 53/551 |
| 4,663,917 | 5/1987 | Taylor et al. | 53/552 |
| 4,757,668 | 7/1988 | Klinkel et al. | 53/551 X |
| 4,850,392 | 4/1986 | Lagerstedt et al. | 53/552 X |
| 4,947,618 | 8/1990 | Schneider et al. | 53/552 X |
| 5,026,253 | 11/1991 | Bacon et al. | 53/551 X |
| 5,203,145 | 4/1993 | Kammler et al. | 53/552 |

Primary Examiner—Horace M. Culver
Attorney, Agent, or Firm—Koda and Androlia

[57] ABSTRACT

A longitudinal bag-making, filling and packaging machine, wherein in an outer surface of a product falling and filling tube wrapped by a packaging film folded into a tubular shape by a bag-making device, the packaging film is continuously fed downward by a film feeding device and an edge of the packaging film of which film inner surfaces are superposed on each other in a rib-like fashion is held in a longitudinal sealing device to longitudinally disposition-seal the end edge to form a packaging tube, an article to be packaged supplied through the product falling and filling tube is filled into the packaging tube hung down from the product falling and filling tube and the upper and lower portions of the article to be packaged of the packaging tube are laterally dipositioned-sealed into two strips by a lateral sealing and cutting device and the sealed portion of the two strips is cut.

2 Claims, 10 Drawing Sheets

LONGITUDINAL BAG-MAKING, FILLING AND PACKAGING MACHINE

DETAILED DESCRIPTION OF THE INVENTION

1. Industrial Field of the Invention

The present invention relates to a longitudinal bag-making, filling and packaging machine which employs a continuous feed as a film feed, which can well effect a longitudinal seal in which end edges of a packaging film are made to butt in a rib-like fashion while adequately controlling a deposition temperature of a longitudinal heater or end edges of a packaging film are superposed before and behind, and which causes a lateral heater to effect the box motion to provide a powerful lateral seal.

2. Prior Art

A longitudinal bag-making, filling and packaging machine is designed so that in an outer surface of a product falling and filling tube wrapped by a packaging film folded into a cylindrical shape by a bag-making device, packaging films are intermittently or continuously fed downward by a film feed device so that they are butted in a rib-like fashion or end edges of packaging films .superposed before and behind are applied with a longitudinal seal by a longitudinal sealing device to form a packaging tube, upper and lower portions of an article to be packaged of the packaging tube are laterally deposition-sealed into two strips and the portion between seals of the strips is cut. In the past, the longitudinal bag-making, filling and packaging machine falls an article to be packaged by gravity and fills it into a packaging tube. Therefore, in most case, the feed of a packaging film comprises an intermittent feed, and it rarely comprises a continuous feed. However, with the recent demand of high-speed packaging by clients, the machine with less noises and vibrations is required. Thus, attention has been drawn to a longitudinal bag-making, filling and packaging machine which employs a continuous feed as a feed of packaging films. The conventional longitudinal bag-making, filling and packaging machine which employs a continuous feed as a feed of packaging films was the type in which a lateral bag-making, filling and packaging machine was changed in direction by 90°.

Task to be Solved by the Invention

The above-described longitudinal bag-making, filling and packaging machine which employs a continuous feed as a feed of packaging films was the type in which a lateral bag-making, filling and packaging machine was changed in direction by 90°, which is therefore not high in performance, and there is room for fully solving the problems peculiar to the longitudinal type as noted below. When an attempt is made to increase one packaging speed, it is necessary to increase thermal loads of a longitudinal seal and a lateral seal accordingly. However, in the conventional longitudinal seal for effecting the longitudinal seal of the superposed end edges of a packaging film by a pair of heating rolls and in the conventional lateral seal by way of rotation of a pair of rotational shafts, the longitudinal seal becomes defective because of the insufficient control of heating to the packaging film. In the case where snack cakes such as potato chips are packaged, there has been provided a drawing device in which they are flattened with a packaging tube sandwiched therebetween, in order to prevent them from being so accumuated that they are bited into a lateral heater, and such flattening is moved downward. However, this proposal was not the mechanism that can cope with the implementation of higher packaging speed. That is, there is provided a pair of drawing rods capable of being moved up and down integral with a heater block below a lateral heater, in which snack cakes are fallen and filled into a packaging tube, and after this, a pair of drawing rods are closed so as to secure a-clearance for air escape, and subsequently, the drawing rods are moved down along with the heater block to apply the drawing to the packaging tube whereby the snack cakes having been accumulated on the drawn portion are caused to sink. Then, the pair of heater blocks are moved closer to effect the lateral seal. This packaging speed is very low. In the case where cakes such as chocolate balls are packaged, an amount for one bag falls in the form of a vertically extending distribution, and therefore, when the packaging speed is increased, the cakes which are distributed at an upper position and fallen are hired by the lateral heater. The apparatus for preventing such a biting as described has not been heretofore proposed. In the packaging of snack cakes or the like, air is filled to prevent the bag from being flattened to avoid the breakage of snack cakes or the like. However, the filling of air does not reach the position at which the flatten portion of the bag is subjected to the lateral seal by means of a pair of shutter mounted on the lateral heater. When the inflated bag is subjected to the lateral seal, wrinkles sometimes occurred. Further, in the case where the product falling and filling tube and the bag-making device are changed in size, when the pivoted arm is turned by 90° to move the longitudinal sealing device sidewards and again turned and returned, it has been desired that the adjustment of axial stroke of the pivoted arm can be easily made in order that the longitudinal sealing device may assume the desired proximal position adjusted to the contour of the product falling and filling tube.

Means for Solving the Invention

The present invention has been devised in view of the foregoing. An object of the present invention is to provide a longitudinal bag-making, filling and packaging machine, which employs a continuous feed as a film feed, which is provided with a packaging tube flattening device wherein end edges of a packaging film are butted in a rib-like fashion while adequately controlling a deposition temperature of a longitudinal heater or a longitudinal sealing for superposing end edges of a packaging film before and behind can be well effected, causing a lateral heater to effect box motion to enable the powerful lateral seal and being operatively connected to the box motion of the lateral heaters to effect the longitudinally extending box motion between the heaters, which moves up to a level higher than the lateral heater before the lateral heater is closed and quickly moves down holding the packaging tube to prevent an article to be packaged from being drawn and hired, which can remove wrinkles of the packaging film and which considerably reduce the noises and vibrations of the machine.

Means for Solving the Task

According to the first invention, there is provided a longitudinal bag-making, filling and packaging machine, wherein in an outer surface of a product falling and filling tube 1 wrapped by a packaging film F folded into a tubular shape by a bag-making device 2, the packaging film F is continuously fed downward by a film feeding device C and an end edge f of the packaging film F of which film inner surfaces are superposed each other in a rib-like fashion is held by a longitudinal sealing device A at the pivot end of a horizontal pivoted arm 3 to longitudinally deposition-sal said end edge to form a packaging tube H, an article to be packaged supplied through said product falling and filling tube 1 is filled into the packaging tube H hung down from the product falling and filling tube 1, and upper and lower portions of the article to be packaged of said packaging tube H are laterally deposition-sealed into two strips by a lateral sealing and cutting device D and the sealed portion of said two strips is cut, characterized in that said longitudinal sealing device A is designed so that the front edge f of the packaging film F superposed in a rib-like fashion is sandwiched by a pair of film draw-in rolls 5 power-transmitted by an upper power transmission mechanism 4 mounted on the horizontal pivoted arm 3 to effect drawing-in and guided to be placed in slidable close contact between a pair of rod-like longitudinal heaters 6 and further sandwiched by a pair of heater rolls 8 power-transmitted through a lower power transmission mechanism 7 mounted on the horizontal pivoted arm 3 and rolled-sealed while feeding the film at the rate greater than the draw-in rate of the film drawing roll 5; said sealing and cutting device D is designed so that a pair of lateral heater mounting plates 10 each supporting a lateral heater 9 are brought into engagement with the annularly grooved cams 13a, 13b or 14a, 14b through cam engaging rods 12 provided at both ends of each of said lateral heater mounting plates 10 and turned by a pivoted lever 15 which extends through the annular grooved cams 13a, 13b or 14a, 14b whereby the lateral heater mounting plates are moved upward in the state where a pair of lateral heaters 9 are opened, at which up position the mounting plates are registered with registered marks on the packaging film F and closed to provide the deposition seal for lateral two strips, and the mounting plates move down a predetermined distance in synchronism with the film rate, at which down position the mounting plates are again opened to avoid the interference with the article to be packaged so as to repeat a pair of symmetrical box motions m1 and m2 to be moved up and returned; and the lateral seal- and cutting device D is further provided with a packaging tube flattening device E wherein a pair of horizontal and parallel drawing rods 21, 21 are operatively connected to the box motions m1 and m2 to effect a pair of longitudinally extending symmetrical box motions n1 and n2 between the heaters when the lateral heaters 9 are opened and move upward to a position higher than the lateral heaters 9 to hold the packaging tube H therebetween and move downward to flatten the packaging tube H over the required length.

According to the second invention of the present application, there is provided a longitudinal bag-making, filling and packaging machine, wherein in an outer surface of a product falling and filling tube 1 wrapped by a packaging film F wrapped by a packaging film F folded into a tubular shape by a bag-making device 2, the packaging film F is continuously fed downward by a film feeding device C and an end edge f of the packaging films F superposed before and behind is held by a longitudinal sealing device B provided at the pivot end of a horizontal pivoted arm 3 to longitudinally deposition-seal the end edges f together of the packaging film F to form a packaging tube H, and upper and lower portions of the article to be packaged of said packaging tube H are laterally deposition-sealed into two strips by a lateral sealing and cutting device D so as to cut the sealed portion of said two strips, characterized in that said longitudinal sealing device B is designed so that the front edge f of the packaging film F is pressed by a rod-like longitudinal heater 16 and an arch-like film pressing plate spring 17 mounted on the outer surface of a product falling and filling tube 1, and the front edge f of the packaging film F is rolled, in the vicinity of the lower side thereof, by a film feed roll 19 power-transmitted through a lower power transmission mechanism 18 which moves closer during the packaging operation and is mounted on the horizontal pivoted arm 3 and a floating roll 20 mounted on the outer surface of the product falling and filling tube; said lateral sealing and cutting device D is designed so that a pair of lateral heater mounting plates 10 each supporting a lateral heater 9 are brought into engagement with annular grooved cams 13a, 13b or 14a, 14b through cam engaging rods 12 provided on both ends of each of the lateral heater mounting plates 10 and turned by a pivoted lever 15 which extends through the annular grooved cams 13a, 13b or 14a, 14b, whereby said mounting plates 10 move upward in the state where the pair of lateral heaters 9 are opened, at which up position the mounting plates are registered with register marks printed on the packaging film F and closed to provide the deposition seal for lateral two strips, and the mounting plates move down a predetermined distance in synchronism with the film rate, at which down position the mounting plates are again opened to avoid the interference with the article to be packaged so as to repeat a pair of symmetrical box motions m1 and m2 to be moved up and returned; n and the lateral sealing and cutting device D is further provided with a packaging tube flattening device E wherein a pair of horizontal and parallel drawing rods 21, 21 are operatively connected to the box motion to effect a pair of longitudinal symmetrical box motions n1 and n2 between the heaters when the lateral heaters 9 are opened and move upward to a position higher than the lateral heaters 9 to hold the packaging tube H therebetween and move downward to flatten the packaging tube H over the required length.

Operation

First, the operation of the first invention according to the present application will be described. When the packaging starts, the longitudinal heater 6 and the heater roll 8 hold the end edge f of the packaging film F superposed in a rib-like fashion. The film feeding device G continuously feeds the packaging film F, the pair of film drawing rolls 5 draw the packaging film F, and the pair of heater rolls 8 pull the packaging film F at the speed faster in the predetermined rate than the film drawing rolls 5. Thus, the end edge f of the packaging film F which flows between the drawing rolls 5 and the heater rolls 8 assumes the tension state, in which state the film F smoothly moves while slidably contacting the fine gap between the pair of vertically extending longitudinal heaters 6, during which the end edge f of the packaging film F is heated to a temperature capable of being deposited while generating a creep phenomenon so that the pressing seal becomes weak. The pair of heater rolls 8 apply the heating seal to the end edge f of the packaging film F in addition to the heating by the longitudinal heaters 6 to provide a complete longitudinal seal. The pair of lateral heaters 9 starts their closing operation and move upward till the lateral seal starts. At this time, the pair of drawing rods 21, 21 close each other in the proximal state prior to the lateral heater 9 with the upper end thereof positioned at a level higher than the lateral heaters 9 to hold the packaging tube H therebetween so that the latter is flattened, and draw it downward before the lateral heaters 9 are closed after which they move down. At this time, the articles to be packaged accumulated at a level higher than the same level as that of the lateral heaters 9 or the articles to be packages which are falling down are drawn off to prevent the articles to be packaged from being bited by the lateral heaters 9 and introduce suitable air therein. The lateral heaters 9 close each other and start the lateral seal. Then, the lateral heaters 9 are placed in complete synchronism with the down speed of the packaging tube H and move down to continue the lateral seal. At this time, the drawing rods 21, 21 move down together with the lateral heaters 9 at a position lower by a predetermined amount than the lateral heaters 9 and first arrive at a position lower than the lowest down position of the lateral heaters 9, and start to open. Subsequently, when the lateral heaters 9 arrive at the lowest down position, they terminate the lateral seal and start to open, at which time, the pair of drawing rods 21, 21 start to ascend prior to the lateral heaters 9 and move up at the high speed avoiding the innermost side of the lateral heaters 9.

Next, the operation of the second invention according to the present invention will be described. When the packaging starts, the longitudinal heaters 6 press so that the required length of the middle portion of the film pressing plate spring 17 is flexed and deformed into a straight line, and the film feed roll 19 cooperates with the floating roll 20 to hold the packaging film F. Accordingly, the end edge f of the packaging film F is pressed for a given section by the lateral heaters 16 and the film pressing plate spring 17 and heated to a temperature capable of being deposited by the longitudinal heaters 16. The end edge f of the packaging film F then slidably passes while being subjected to the weak pressing seal, and is then sandwiched between the film feed rolls 19 to be rotatively driven and the floating roll 20, in which state the end edge f is pulled from the bottom and fed in such a manner as to prevent the packaging film F from being caught and stopped by the pressing forces of the longitudinal heaters 16 and the film pressing plate spring 17, and the pressing seal can be completely carried out so that the heat seal without distortion of the seal surface. The operation and function of the pair of lateral heaters 9 and the pair of drawing rods 21, 21 are the same as those of the first invention according to the present application.

Embodiments

Figure 1:
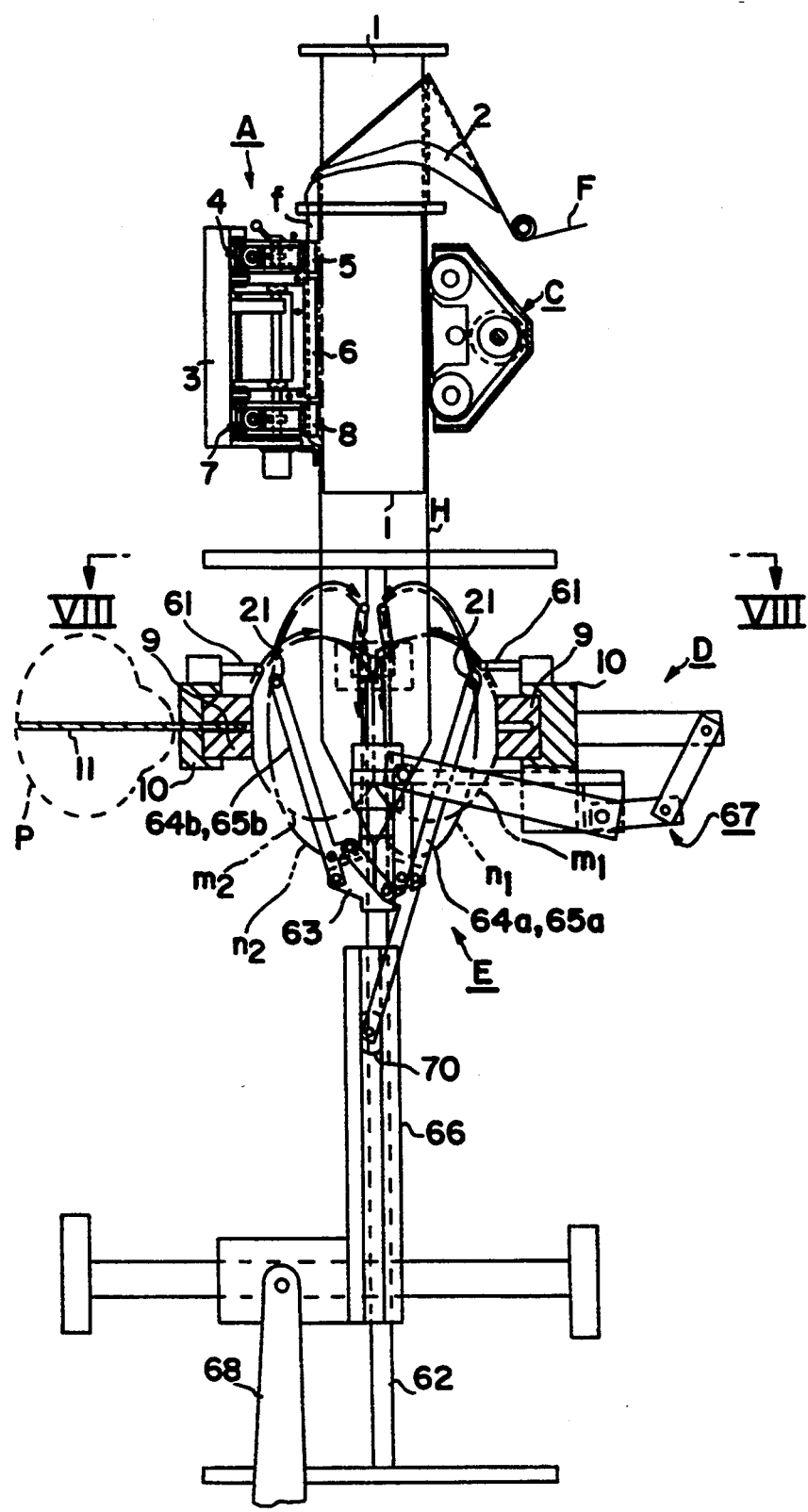
FIG. 1 is a schematic side view showing the whole body when the longitudinal box-making, filling and packaging machine according to the embodiment of the first invention of the present application is not engaged in the lateral seal.
Figure 2:
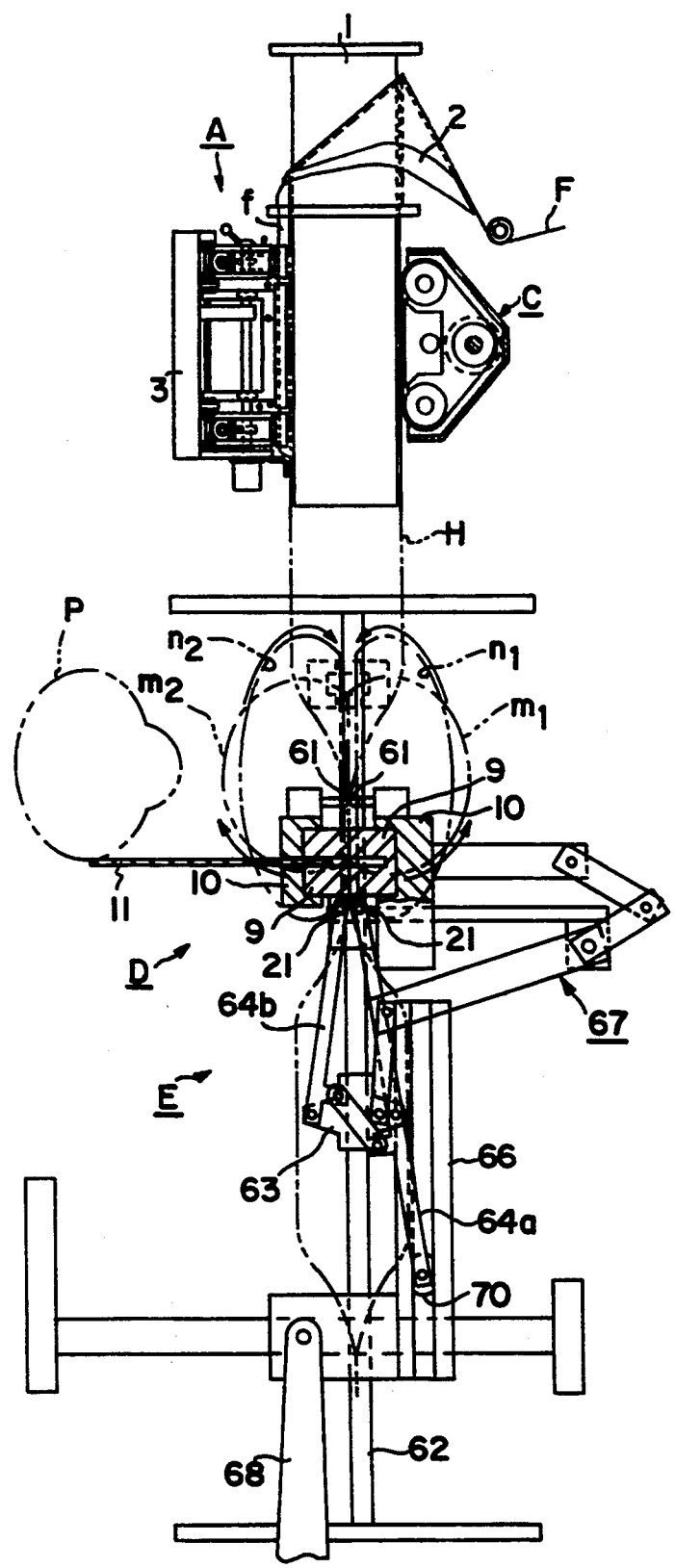
FIG. 2 is a schematic side view showing the whole body when the longitudinal box-making, filling and packaging machine shown in FIG. 1 is encased in the lateral seal.

Embodiments of the longitudinal bag-making, filling and packaging machine according to the first invention of the present application will be described hereinbelow with reference to FIGS. 1 to 9. FIGS. 1 and 2 are respectively schematic side views showing the whole body of the longitudinal bag-making, filling and packaging machine. This longitudinal bag-making, filling and packaging machine comprises a bag-making device 2 provided at the upper portion of a product falling and filling tube 1, a longitudinal seal device A capable of being adjusted in forward movement so as to hold the lower portion of the product falling and filling tube 1, a film feed device C capable of being adjusted in rearward movement, a lateral seal cutting device D in which a pair of lateral heaters 9, 9 effect symmetrical box motions m1 and m2 which are the locus operation of an endless flat loop restricted by the cam curve, said lateral seal cutting device D being provided at the lower portion of the product falling and filling tube 1, and a packaging tube flattening device E in which a pair of drawing rods 21, 21 are operatively connected to the box motions m1 and m2 of said seal cutting device D to effect symmetrical box motions n1 and n2 which are the locus operation of an endless further longitudinally flattened loop restricted by two slide strokes, said packaging tube flattening device being likewise provided at the lower portion of the product falling and filling tube 1. FIG. 1 shows the state where the lateral heaters 9, 9 and the drawing rods 21, 21 are open and now ascending, and the packaging tube H is moving down between the lateral heaters 9, 9. FIG. 2 shows the state where the drawing rods 21, 21 flatten the packaging tube H and move down, the lateral heaters 9, 9 are closed when the drawing rods are moved downwardly of the lateral heaters 9, 9 to apply the lateral seal of two strips to the packaging tube H, and they are then at the down position. The product falling and filling tube 1 has its upper end supported on the machine frame not shown and is connected to a hopper or a rotary kiln not shown. The tube 1 performs the function to permit a predetermined quantity of articles to be packaged intermittently fallen and supplied within the tube to pass therethrough and permit a packaging film F for wrapping the product falling and filling tube 1 to be subjected to the longitudinal seal by a longitudinal seal device A to fill it into the packaging tube H hung down from the product falling and filling tube 1.

Figure 3:
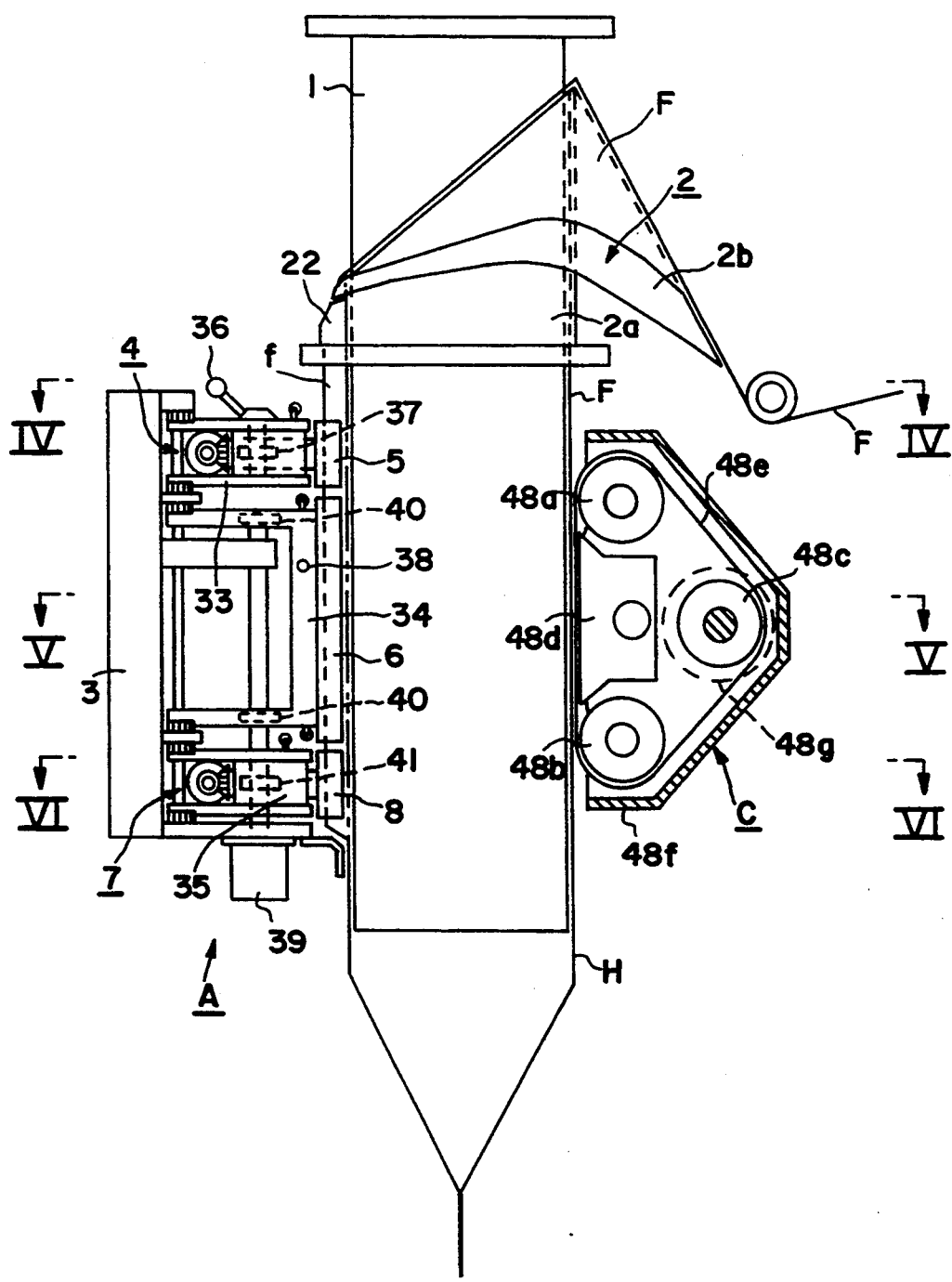
FIG. 3 is a side view showing essential parts of the longitudinal box-making, filling and packaging machine shown in FIG. 1 with an upper half portion enlarged.

As shown in FIG. 3, the bag-making device 2 comprises a tubular portion 2a having a horizontal section of C-shape with a slit formed in the front side thereof, and a collar portion 2b extending from the upper edge of said tubular portion 2a. The collar portion 2b surrounds the upper middle portion of the product falling and filling tube 1 while securing a uniform clearance of 2 to 3 mm in the circumference, the collar portion 2b having a curved shape so that the packaging film F is cylindrically three-dimensionally curved without occurrence of wrinkles from the plane. The bag-making device 2 guides the continuous web-like packaging film F to the collar portion 2b and cylindrically guides the packaging film F from the bended edge to and between the product falling and filling tube 1 and the tubular portion 2a. The tubular portion 2a serves to stabilize the packaging film F so that the latter is formed into a cylindrical shape to wrap the product falling and filling tube 1 in a close contact state. The end edge f of the packaging film F is permitted to pass through the slit of the tubular portion 2a and is stood upright in a rib-like manner with respect to the product falling and filling tube 1, and the inner surfaces of the film are placed in close contact and maintained substantially in a close contact state by a film end edge adjusting unit 22.

As shown in FIGS. 3 to 7, the longitudinal seal device A is provided at the turning end of a horizontal pivoted arm 3 which is horizontally turnable in front of the product falling and filling tube 1. The horizontal pivoted arm 3 has the function, when the product falling and filling tube 1 and the bag-making device 2 are changed in size, to greatly move the longitudinal seal device A from the front side of the product falling and filling tube 1, and to adjust the position of the longitudinal seal device A while being adjusted to the change of size. More specifically, the horizontal pivoted arm 3 is pivoted at the pin shaft 26 on a slider 25 supported slidably in a lateral direction on a housing 24 provided on the machine side frame 25, and can be horizontally turned to the left and opened in front of the product falling and filling tube 1 by loosening a lock bolt 27. The slider 25 supports a slide shaft 28 having a threaded portion 28a to be inserted therein and can adjust a position of a nut runner 31 threadedly engaged with the threaded portion 28a of the slide shaft 28 by loosening the lock bolt 29 to turn a knob 30 secured to the front end of the slide shaft 28. The nut runner 31 is secured to the threaded portion 28a in such a manner that the slit is fastened by the lock nut 32. Accordingly, when the lock nut 29 is tightened, the slider 28 is rendered unslidable whereas when the lock bolt 29 is loosened, the nut runner 31 is rendered slidable within an internal space 24a of the housing 24 so that the slider 25 can be drawn or forced in by a stroke of the nut runner 31, thus facilitating positioning of the longitudinal seal device A toward the product falling and filling tube 1.

Figure 4:
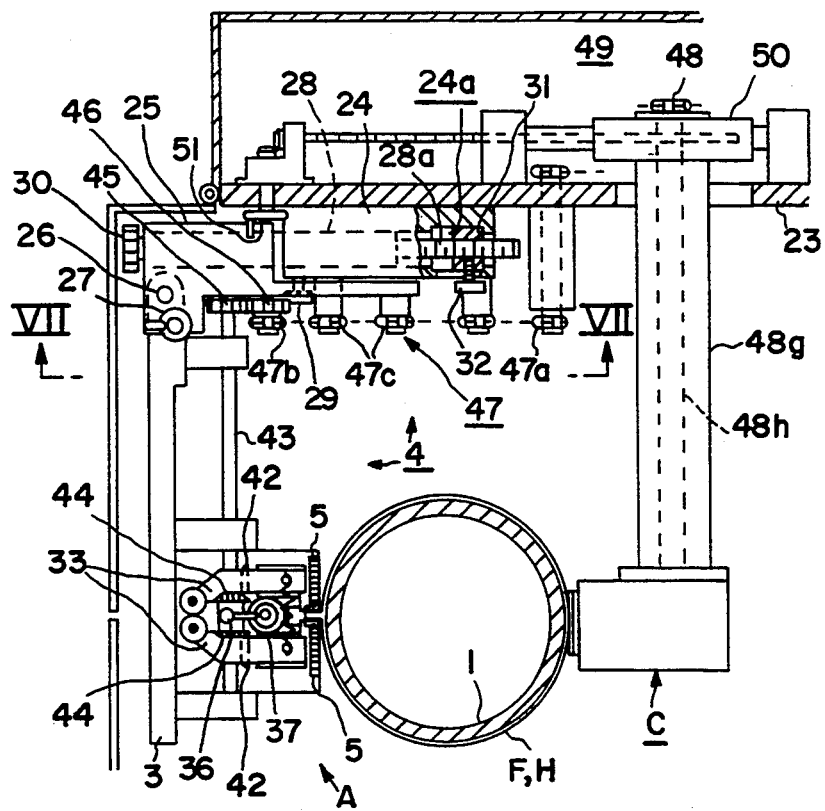
FIG. 4 is a horizontal sectional view taken on line IV—IV in FIG. 3.
Figure 5:
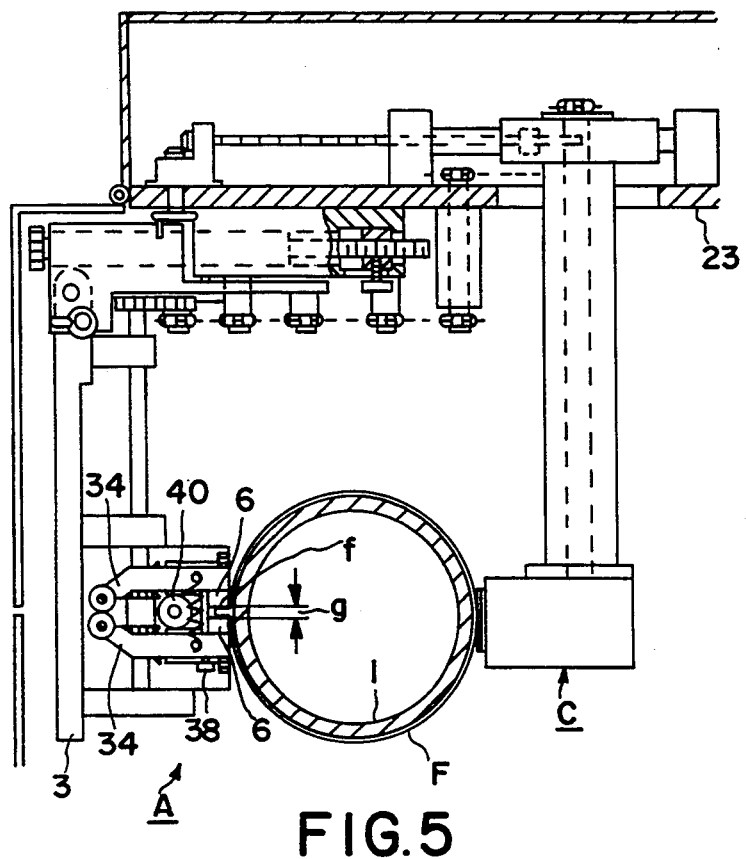
FIG. 5 is a horizontal sectional view taken on line V—V in FIG. 3.
Figure 6:
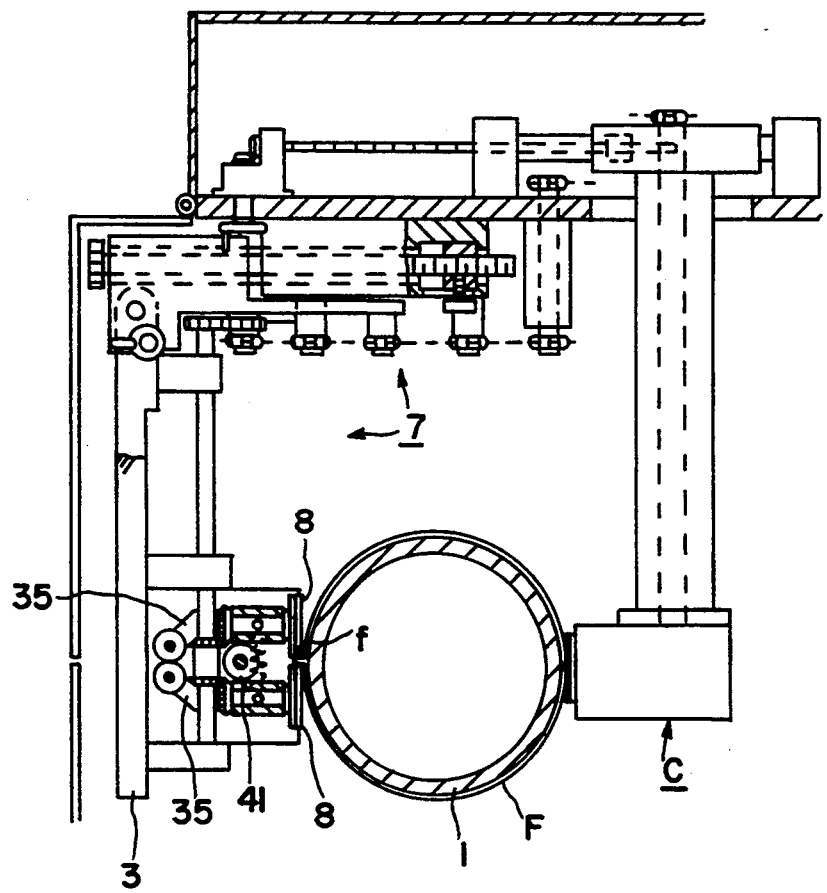
FIG. 6 is a horizontal sectional view taken on line VI—VI in FIG. 3.
Figure 7:
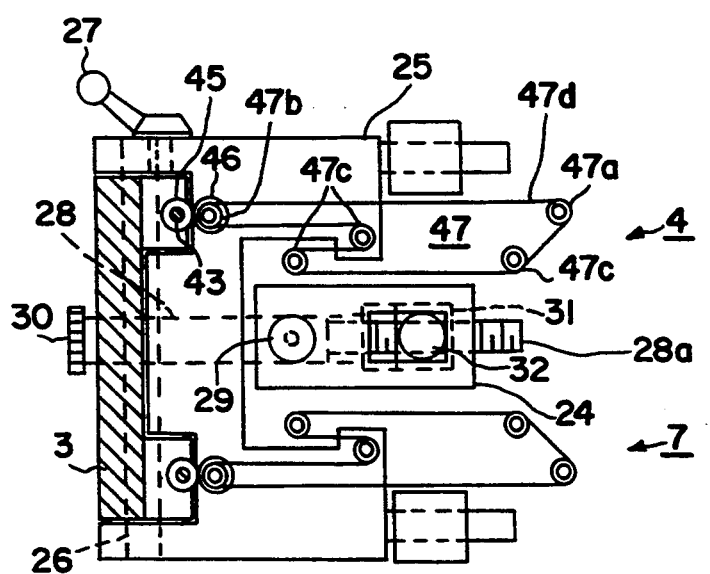
FIG. 7 is a longitudinal sectional view taken on line VII—VII in FIG. 4.

The longitudinal seal device A is designed so that as shown in FIGS. 3 and 4, the end edge of the packaging film F is held by a pair of film drawing rolls 5 positioned at the upper stage of a three-stage arrangement opposed to the front of the product falling and filling tube 1 for effecting drawing; as shown in FIGS. 3 and 6, the end edge f of the packaging film F is held by a pair of heater rolls 8 positioned at the lower state of said three-stage arrangement for effecting drawing at a faster speed; and as shown in FIGS. 3 and 5, the end edge f of the packaging film F stretched between both the rolls is held slidably and in a close contact manner by a pair of rod-like longitudinal heaters 6 positioned at the middle stage of said three-stage arrangement for effecting continuous longitudinal seal. As shown in FIG. 4, the film drawing rolls 5 are transmitted in power through an upper power transmission mechanism 4 mounted on the horizontal pivoted arm 3, and as shown in FIG. 6, the heater rolls 8 are transmitted in power through a lower power transmission mechanism 7 mounted on the horizontal pivoted arm 3. As shown in FIG. 5, the pair longitudinal heaters 6 hold the end edge f of the packaging film F therebetween in a slidable state to heat and deposit it, and is moved away from the end edge f of the packaging film F when the packaging film F stops to move. The pair of heater rolls 8 are provided with seals around the rolls and roll and heat the end edge of the packaging film F to provide seals and deposite it, and when the packaging film f stops to move, the heater rolls 8 are moved away from the end edge f of the packaging film F. More specifically, as shown in FIGS. 3 to 6, the film drawing rolls 5, the longitudinal rolls 6 and the heater rolls 8 are closeably journalled or fixedly supported on an upper-stage bracket 33, a middle-stage bracket 34 and a lower-stage bracket 35, respectively, in the form of a pair of left and right three-stage arrangement, which are opposed to the front side of the product falling and filling tube 1 and having the construction in which they are opened and closed to left and right with a spacing center being set as a reference. The brackets 33, 34 and 35 are urged in a direction being closed by a spring. The pair of film drawing rolls 5, 5 are moved away from the end edge f of the packaging film F, when the packaging film F is stretched or the horizontal pivoted arm 3 is opened, by turning a feed-in handle 36 to rotate an elliptic cam 37 by a predetermined angle and pushing open the upper-stage bracket 33 by the elliptic cam 37. As shown in FIG. 5, a gap g between the pair of longitudinal heaters 6 is finely adjusted by adjusting a threaded stopper 38. As shown in FIG. 3, the pair of longitudinal heaters 6 and the pair of heater rolls 8 are moved away from the end edge f of the packaging film F by turning by 90° elliptic cams 40, 41 which are rotated by a rotary actuator 39 when the film stops to be fed to push open the middle-stage bracket 34 and the lower-stage bracket 35. As shown in FIGS. 4, 6 and 7, the pair of film drawing rolls 5 and the pair of heater rolls 8 are transmitted in power through the upper power transmission mechanism 4 or the lower power transmission mechanism 7.

As shown in FIGS. 4, 6 and 7, the upper power transmission mechanism 4 and the lower power transmission mechanism 7, which are substantially the same mechanism, are vertically juxtaposed and provided over the machine side frame 23, the housing 24, the slider 25 and the horizontal pivoted arm 3. The upper power transmission mechanism 4 will be described below with reference to FIGS. 4 and 7. Bevel gears 42, 42 integrally provided coaxial with the pair of film drawing rolls 5, 5 are meshed with a pair of bevel gears 44, 44 fixedly mounted on a horizontal transmission shaft 43 provided on the horizontal pivoted arm 3, a driven gear 45 provided on the distal end of the horizontal transmission shaft 43 is meshed with a driving gear 46 provided on the slider 25 when the horizontal pivoted arm 3 is closed, and the driving gear 46 is connected to a wrapping transmission device 47 connected to a driving source not shown. The wrapping transmission device 47 comprises a wrapping driving wheel 47a provided on the machine side frame 23, a wrapping driven wheel 47b provided on the slider 25 to transmit power to the driving gear 46, and an endless change 47b passed over a plurality of wrapping intermediate wheels 47c, . . . Even if the slider 26 is at either drawing position or pushing-in position, the endless chain 47d is not loosened, and when the horizontal pivoted arm 3 is closed, the driven gear 45 and the driving gear 46 are meshed with each other. Therefore, even if the slider 25 is adjusted in movement as the product falling and filling tube 1 is changed in size, the turning force for auxiliarily feeding the end edge f of the packaging film F is transmitted to the pair of film drawing rolls 5, 5 by the upper power transmission mechanism 4, and the turning force is transmitted to the pair of heater rolls 8 with seals by the lower power transmission mechanism 7 to roll the end edges f of the packaging film F together to heat and deposition seal them. The heater roll 8 has a diameter set to be larger by 10% to 20% as compared with that of the film drawing roll 5. Because of this, the heater roll 8 becomes large by 10% to 20% so that the roll feed speed thereof corresponds to the diameter ratio as compared with the auxiliary feed speed of the packaging film F of the film drawing roll 5.

As shown in FIG. 4, the horizontal pivoted arm 3 is closed at right angles to the slider 25, and the nut runner 31 is drawn to the stop end in front of the machine by turning the knob 30, in which state the lock bolt 29 is loosened to carefully push the slider 25 into the housing 24, and the pair of longitudinal heater rolls 6, 6 shown in FIG. 5 are placed in a closed state which is not yet preheated to index the position close to the product falling and filling tube 1. Then, the lock bolt 29 is tightened to fix the slider 25 and the knob 30 is turned to retreat the nut runner 31 to the stop end on the rear side of the machine, in which state the lock bolt 32 is tightened to fix the threaded portion 28a of the nut runner 31. Then, the lock bolt 29 is tightened to remove and move the slider 25 until the nut runner 31 comes into contact with the stop end in front of the machine, after which the lock bolt 27 is loosened so as to open the horizontal pivoted arm 3. As shown in FIGS. 3 and 5, the rotary actuator 39 is actuated to release the opening action of the cam 40 with respect to the middle-stage bracket 34 and the pair of longitudinal heaters 6, 6 are closed each other by means of the spring. Then, the threaded stopper 38 is adjusted to set the gap g between the heaters to a fine dimension as desired, after which the actuator is again actuated to effect the opening action of the cam 40 with respect to the middle-stage bracket 34 to open the pair of longitudinal heaters 6, 6. In this state, the packaging film F is placed over the bag-making device 2 to be passed so as to wrap the product falling and filling tube 1, and the left and right end edges f of the packaging film F are butted in a rib-like manner in front of the product falling and filling tube 1. Then, the horizontal pivoted arm 3 is closed, the lock bolt 27 is tightened, and the slider 25 is pushed and moved, after which when the lock bolt 29 is tightened, the pair of film drawing rolls 5, the pair of longitudinal heaters 6 and the pair of heater rolls 8 are moved away to the position at which the end edges f of the packaging film F are held therebetween. Here, the handle 36 shown in FIG. 4 is turned to turn the cam 37 by 90°, and the pair of film drawing rolls 5, 5 are closed by the force of the spring to hold the end edge f of the packaging film F. The operation is now ready.

As shown in FIGS. 3 and 4, the film feed device C has its distal end supported on the machine side frame 23 and extended toward the rear side of the product falling and filling tube 1 in a cantilever manner, which is simple, and can secure a large space at the rear of the product falling and filling tube 1 to facilitate cleaning. The film feed device C has a head portion comprising upper and lower toothed wheels 48a, 48b, a toothed wheel 48c positioned in the rear middle portion, a vacuum box 48d, a toothed endless belt 48e formed with a number of intake holes in the whole periphery thereof and a casing 48f. The head portion is supported on a movable table 50 provided in a chamber for receiving a drive transmission system 49 through a tubular cantilever arm 48g, said toothed wheel 48c being connected to a transmission shaft 48h extending into the cantilever arm 48g. The toothed endless belt 48e continuously feed the film while attracting and holding the packaging film F which flows between the belt 48e and the rear surface of the product falling and filling tube 1. The movable table 50 is adjusted in movement in the lateral direction through the threaded shaft 52 by turning the handle 51. The transmission shaft 48h is connected to a servo motor not shown through a sprocket 48i secured to the shaft end.

Figure 8:
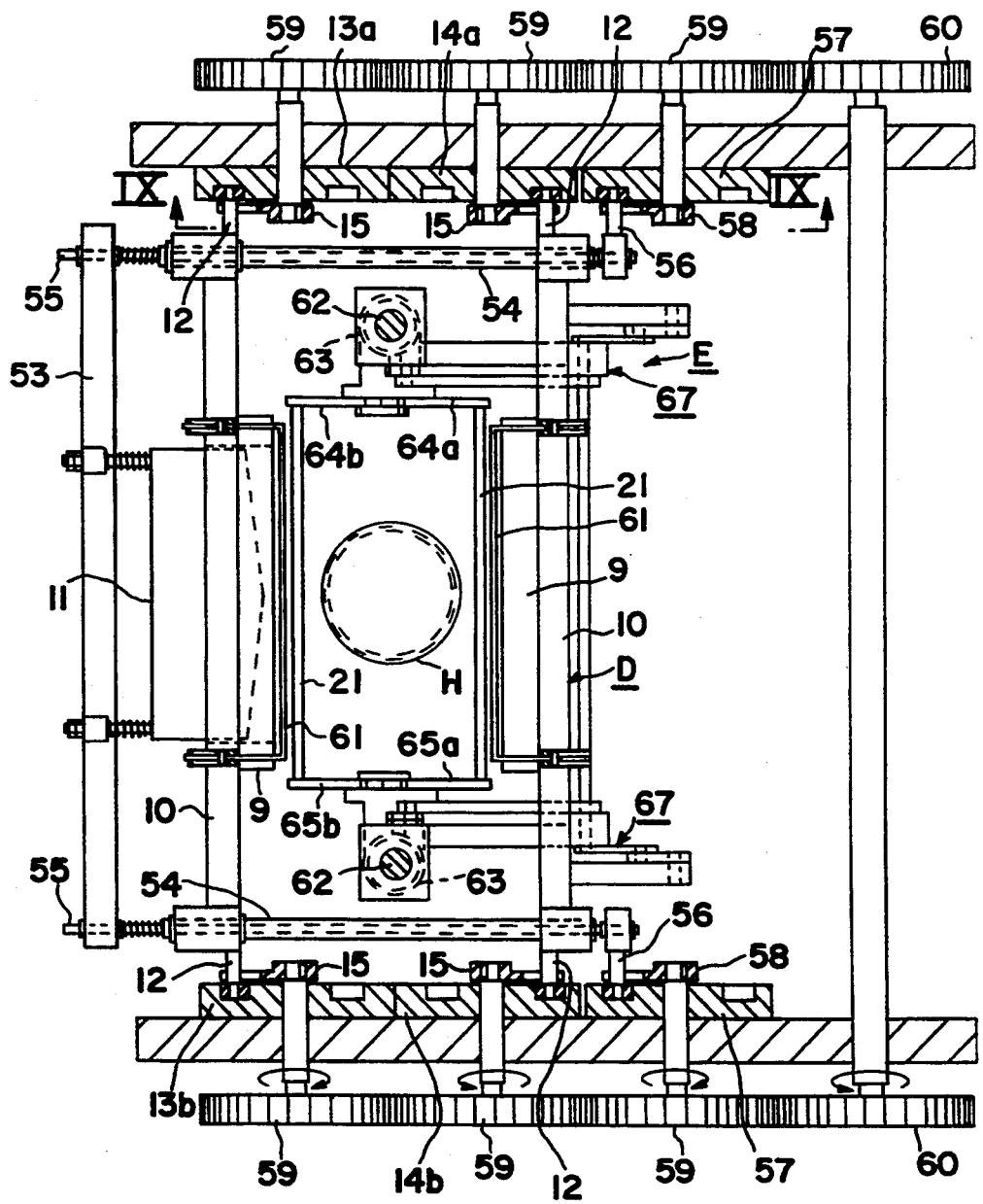
FIG. 8 is a view taken on line VIII—VIII in FIG. 1.
Figure 9:
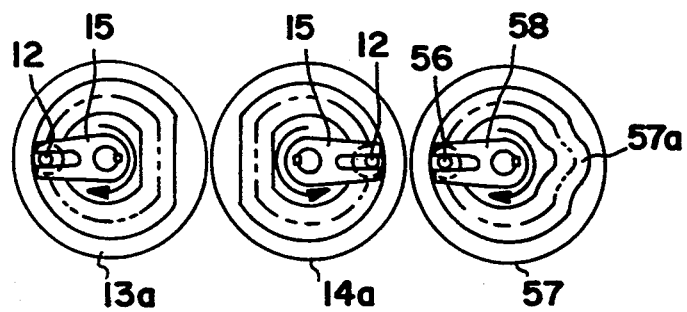
FIG. 9 is a view taken on line XI—XI in FIG. 8.
Figure 10A:
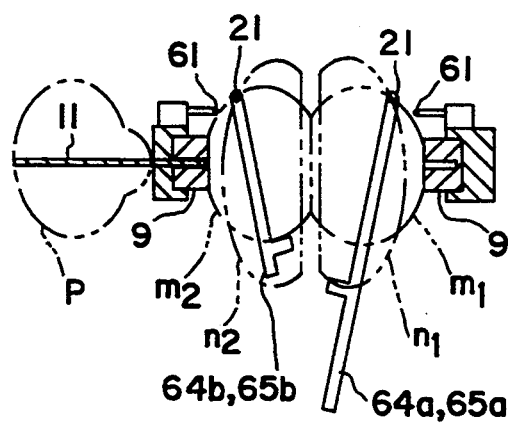
FIGS. 10a–10f show the steps for explaining the relative operation of a lateral seal cutting device, which constitutes the lower half portion and a packaging tube flattening device in the longitudinal bag-making, filling and packaging machine shown in FIG. 1.
Figure 10B:
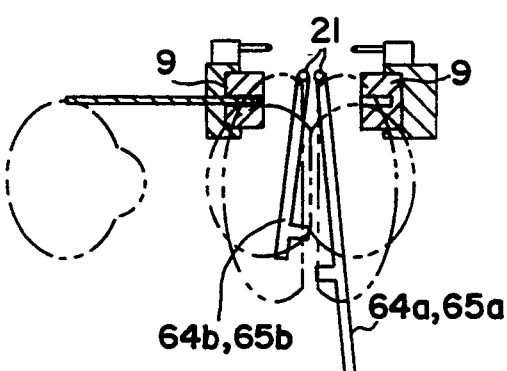
Figure 10C:
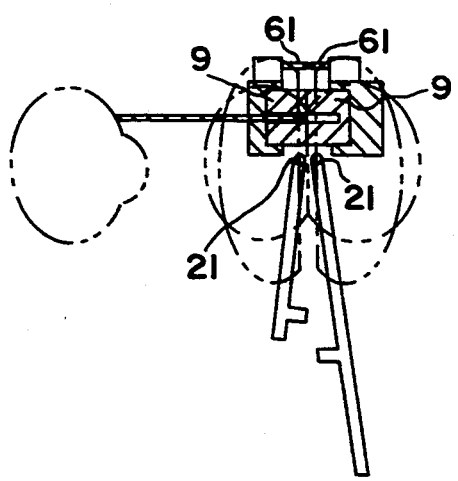
Figure 10D:
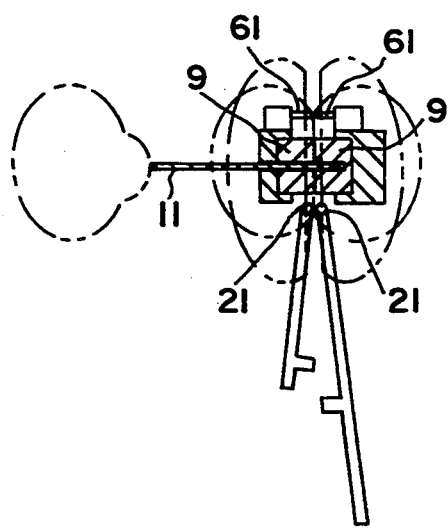
Figure 10E:
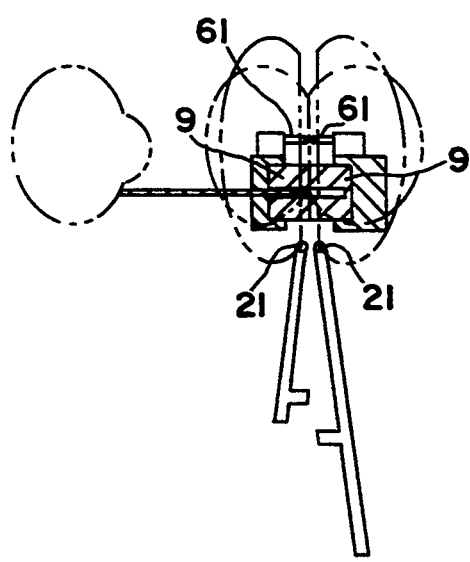
Figure 10F:
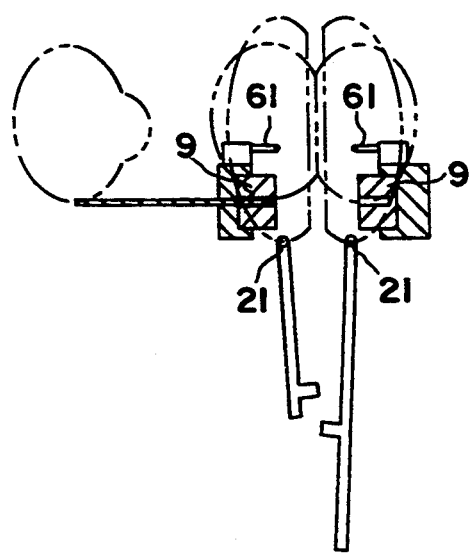

As shown in FIGS. 1, 2 and 10, the lateral seal cutting device D has a pair of lateral heaters 9, 9 for carrying out circular box motions m1 and m2 in laterally symmetrical with one vertical surface passing through substantially the center of the product filling tube 1, the lateral seal cutting device D being designed so that a pair of lateral heaters 9, 9 move upward in their open state, are adjusted to registration marks printed on the packaging film F at the up position corresponding to the position avoiding the article to be packaged of the packaging tube H and closed to laterally deposition-seal two strips, the portion between seals of said two strips is cut by a force-cutting cutter 11, the lateral heaters 9, 9 are again moved down a predetermined distance in synchronism with the film speed, and are again opened at the down position to repeat the box motions m1 and m2 which move up and return avoiding the interference with the article to be packaged. As shown in FIG. 8, in the lateral seal cutting device D, the lateral heaters 9, 9 capable of carrying out the two-strip seal are supported on a pair of lateral heater mounting plates 10, 10, the force-cutting cutter 11 is mounted on one of the lateral heaters 9, the pair of lateral heater mounting plates 10, 10 are brought into engagement with annular grooved cams 13a, 13b or 14a, 14b through engaging rods 12 provided on both ends thereof and are turned by the pivot lever 15 which extends through the annular grooved cams 13a, 13b or 14a, 14b whereby the lateral heaters 9, 9 depict the loci m1 and m2 of the box motion. That is, the pair of lateral heaters 9 move upward in their open state, at which up position the lateral heaters coincide with the registration marks printed on the packaging film F and are closed to laterally deposition-seal two strips, and subsequently the lateral heaters are moved down a predetermined distance in synchronism with the film speed, at which down position the lateral heaters are again opened to repeat the box motions m1 and m2 which move up and return avoiding the interference with the article to be packaged. The lateral seal cutting device D is provided with a force-cutting rod 53 provided parallel with one heater mounting plate 10. Two horizontal guides 54 having the distal end extending through and being secured to both ends of the lateral heater mounting plate 10 on the right hand in FIG. 8 and the other end slidably fitted into both ends of the lateral heater mounting plate 10 on the left hand are provided. Two slide rods 55, 55 connected to the both ends of the force-cutting rod 53 are made to extend through horizontal guide tubes 54, 54, and cam engaging rods 56, 56 secured to the right ends of the slide rods 55 are brought into engagement with cam grooves of a pair of annular grooved cams 57, 57 on the right side and are engaged with a pair of pivot levers 58, 58 on the right side provided extending through the annular grooved cams 57 so that the former may be turned. As shown in FIG. 9, the right annular grooved cam 58 is cam for operating the force-cutting cutter and has an outwardly inflated portion 58a in the midst of a flat groove portion as compared with the left annular grooved cam 13a so that the slide rods 55, 55 shown in FIG. 8 are slidably moved relatively rightward with respect to the horizontal guide tubes 54, 54 whereby the force-cutting cutter 11 forcibly moves during the time when the lateral heaters 9, 9 laterally seal the two strips and move down. Three pivot levers 15, 15, 58 on both sides are connected coaxial with gears 59, 59, 59 having the same number of teeth, said gears 59, 59, 59 being meshed in order, and gear trains on both sides are connected by synchronous gears 60, 60 and are rotated by a servo motor not shown. On the upper surfaces of the lateral heater mounting plates 10 are mounted shutters 61, 61 which are closed prior to the closure of the lateral heaters 9, 9 to close the packaging tube to avoid occurrence of wrinkles.

As shown in FIGS. 1, 2 and 8, the lateral seal cutting device D is provided with a packaging tube flattening device E having two drawing rods 21, 21 which are associated with the box motions m1 and m2 of the lateral heaters to effect longitudinal box motions m1 and m2 between the heaters. The packaging tube flattening device E moves up to a position higher than the lateral heaters 9 before the lateral heaters 9 are closed to hold the packaging tube H therebetween and quickly moves down to retreat the article to be packaged below the lateral heaters 9 to prevent it from being bited and to remove wrinkles from the packaging film F. The packaging tube flattening device E is provided with a pair of longitudinal guides 62, 62 on both sides in a longitudinal direction of the lateral heaters 9, two pairs of oscillating fingers 64a, 64b and 65a and 65b which are opened and closed within the vertical plane matched to the opening and closing direction of the lateral heaters 9 are mounted on slide bosses 63 guided by the longitudinal guides 62, and two drawing rods 21, 21 are provided so as to connect the oscillating fingers 64a, 65a or 64b, 65b passing parallel with the front side of the pair of lateral heaters 9. As shown in FIG. 1, means for permitting the two pairs of oscillating fingers 64a, 64b and 65a, 65b to effect oscillation and up- and down movements for permitting two drawing rods 21, 21 to effect box motions n1 and n2 are provided separately into two functions, i.e., the oscillation and up- and down movements. The means for permitting the oscillating fingers to effect up- and down movements is composed of a required link mechanism 67 so as to connect the lateral heater mounting plate 10 on the right hand in FIG. 1 with the slide boss 63. The means for permitting the oscillating finger to effect oscillation is constructed such that a cam follower 70 provided at the lower end of each of the right oscillating fingers 64a and 652 is fitted into a longitudinal groove of a channel guide 69 laterally slid by the oscillating arm 68.

FIG. 10 shows the steps for explaining the operation in connection with the lateral seal cutting device and the packaging tube flattening device. The positions of the lateral heaters 6, 6, the force-cutting cutter 11, the shutters 61, 61, the oscillating fingers 642, 64b, 652 and 65b and the drawing rods 21, 21 are changed and circulated in order to (a), (b), (c), (d), (e) and (f). At (a), m1 and m2 indicate the locus of the box motion depicted by the holding surface of the lateral heaters 9, 9 which corresponds to the cam curves of the annular grooved cams 13a and 14a shown in FIG. 8; n1 and n2 indicate the locus of the box motion depicted by the drawing rods 21, 21 due to the oscillation and up- and down movements of the oscillating fingers 64a, 64b, 65a and 65b; and p indicates the locus of the box motion depicted by the rear end of the force-cutting cutter 11 which corresponds to the cam curves of the annular grooved cams 13a and 14a shown in FIG. 8. In (a), the lateral heaters 9, 9 are open and are in the midst of upward movement positioned in the intermediary of the up stroke, the oscillating fingers 64a, 64b, 65a and 65b are moved up in their open state, and the drawing rods 21, 21 move close to the inside of the lateral heaters 9, 9 and are in the midst of upward movement positioned at a level higher than the shutters 61, 61. In (b), the oscillating fingers 64a, 64b, 65a and 65b are closed at a high position, two drawing rods 21, 21 hold the packaging tube therebetween to flatten it, and the lateral heaters 9, 9 are opened at a high position. In (c), the drawing rods 21, 21 hold the packaging tube therebetween and move down at the speed much higher than the film feed speed to the substantially intermediate position of the down stroke, at which time, air is taken into the bag to draw off the articles to be packaged distributed at a high position and fallen and filled. Thereafter, the shutters 61, 61 are closed and cooperate with the drawing rods 21, 21 to secure the flattening of the lateral seal point of the packaging tube. The lateral heaters 9, 9 are adjusted to the registration marks printed on the packaging film to start applying the lateral seal to two strips. When the shutters 61, 61 are closed, the succeeding articles to be packaged fall on the shutters 61, 61. In (d), the shutters 61, 61, the lateral heaters 9, 9 and the drawing rods 21, 21 are closed and are in the midst of downward movement. At the time the lateral heaters 9, 9 assume substantially the intermediate position of the down stroke, the force-cutting cutter 11 cuts the portion between the lateral seals of two strips due to the displacement of the cam curves of the right annular grooved cam 58 and the left annular grooved cam 13a shown in FIG. 8. In (e), the shutters 61, 61, the lateral heaters 9, 9 and the drawing rods 21, 21 are closed and are in the down position. The force-cutting cutter 11 completes the force-cutting and is retreated. In (f), the shutters 61, 61, the lateral heaters 9, 9 and the drawing rods 21, 21 are opened and shifted to the upward movement.

Next, the whole operation of the longitudinal bag-making, filling and packaging machine constructed as described above will be briefly explained. As shown in FIGS. 3, 4, 5, and 6, the packaging film F is guided from the back of the bag-making device 2 to pass it so as to wrap the product falling and filling tube 1 by the folding action of the bag-making device 2. The end edges f of the packaging films F on the both sides are adjusted in a rib-like manner in front of the product falling and filling tube 1. On the other hand, the gap g between the heaters is adjusted and after this the horizontal pivoted arm 3 is turned horizontally to move close to the product falling and filling tube 1. Then, each pair of film drawing rolls 5, 5, longitudinal heaters 6, 6 and heater rolls 8, 8 are separated and confronted at the position capable of holding the end edge f of the packaging film F therebetween. The handle 36 is gripped to rotate the cam 37 and to close the upper-stage bracket 33, whereby if the end edge f of the packaging film F is pressed by the film drawing rolls 5, 5, the operation is ready. When the operation starts, the cams 40, 41 are rotated by the rotary actuator 39 so that the middle-stage bracket 34 and the lower-stage bracket 35 are closed whereby the longitudinal heaters 6, 6 and the heater rolls 8, 8 hold the end edge f of the packaging film F therebetween. The film feed device C continuously feeds the packaging film F, and the film drawing rolls 5, 5 are transmitted in power through the upper power transmission mechanism 4 to roll the end edge f of the packaging film F to auxiliarily feed it. The pair of heater rolls 8 are transmitted in power through the lower power transmission mechanism 7 to pull the end edge f of the packaging film F at the speed faster than the film drawing rolls 5, 5 so that the end edge f of the packaging film F which flows between the film drawing rolls 5 and the heater rolls 8 becomes stretched, in which state the end edge f passes while being moved in sliding contact with a fine gap g between the heaters of the pair of vertically lengthy longitudinal heaters 6. The end edge f is heated to a temperature capable of being deposited while generating a creep phenomenon during the passage and subjected to pressure seal. The presence of the film drawing roll 5 prevents the violent behavior of the end edge f of the packaging film F by permitting the packaging film F to pass through the gap between the heaters, thus effectively preventing the zigzag phenomenon of the packaging film F in the bag-making device 2. The pair of heater rolls 8, 8 carry out the heating seal of the end edge f of the packaging film F in addition to the heating by the longitudinal heaters 6 to effect the complete longitudinal seal to provide seals. In the above-described case, the initial gap g between the pair of longitudinal heaters 6 and 6 is adjusted by the stopper 38 so as to have 2 mm, for example, and the longitudinal heaters 6, 6 and the heater rolls 8, 8 are adjusted so as to assume an adequate temperature while being adjusted to the kinds of packaging films F and the film feed speed. Next, the stopper 38 is adjusted to narrow the gap g between the heaters to suitably adjust the deposition heating by the longitudinal heaters 6, 6. When the pressure seal is incomplete despite the temperatures of the longitudinal heaters 6, 6 and the heater rolls 8, 8 are adequate, the deposition heating by the longitudinal heaters 6, 6 is insufficient. Therefore, the stopper is adjusted to make the fine adjustment so that the gap g between the longitudinal heaters 6, 6 is small. When the gap g between the heaters is made small, the slidable contact pressure and the heating deposition temperature of the packaging film F can be delicately increased, and the pressure seal in the heater rolls 8 can be well carried out. Further, when the pressure seal is carried out in surplus despite the temperatures of the longitudinal heaters 6, 6 and the heater rolls 8, 8 are adequate, the stopper 38 is adjusted to make fine adjustment so as to increase the gap g between the longitudinal heaters 6, 6. When the gap g between the heaters is made to increase, the sliding contact pressure of the packaging film F and the heating temperature caused by radiation and electric heat can be delicately reduced, and the pressure seal by means of the heater rolls 8, 8 is carried out satisfactorily. When the film feed stops, the elliptic ams 40, 41 are rotated by a predetermined angle i by the rotary actuator 39, and the middle-stage bracket 34 and the lower-stage bracket 35 are opened by the projecting action of the cams 40, 41 so that the longitudinal heaters 6, 6 and the heater rolls 8, 8 are moved away from the end edge f of the packaging film F. On the other hand, as shown in FIGS. 1, 2 and 10, the lateral heaters 9, 9 of the lateral seal cutting device D effect the box motions m1 and m2, and the drawing rods 21, 21 of the packaging tube flattening device E effect the longitudinal box motions n1 and n2 interlocked with the box motions m1 and m2. The drawing rods 21, 21 are opened so as not to contact with the article to be packed which falls into the packaging tube H, pass internally of the lateral heaters 9, 9, move up to a level higher than the lateral heaters 9, hold the packaging tube H therebetween to flatten it, rapidly move down to draw off the articles to be packaged accumulated to a level higher than the lateral heaters 9 or the articles to be packaged which are falling to prevent the articles to be packaged from being bited into the lateral heaters 9. Then, the lateral heaters 9, 9 are coincided with the registeration marks of the packaging films and closed, the lateral heaters effecting the powerful heat seal while moving down in synchronism with the film speed, and the force-cutting cutter 11 cuts the portion between the lateral seal of two strips.

Figure 11:
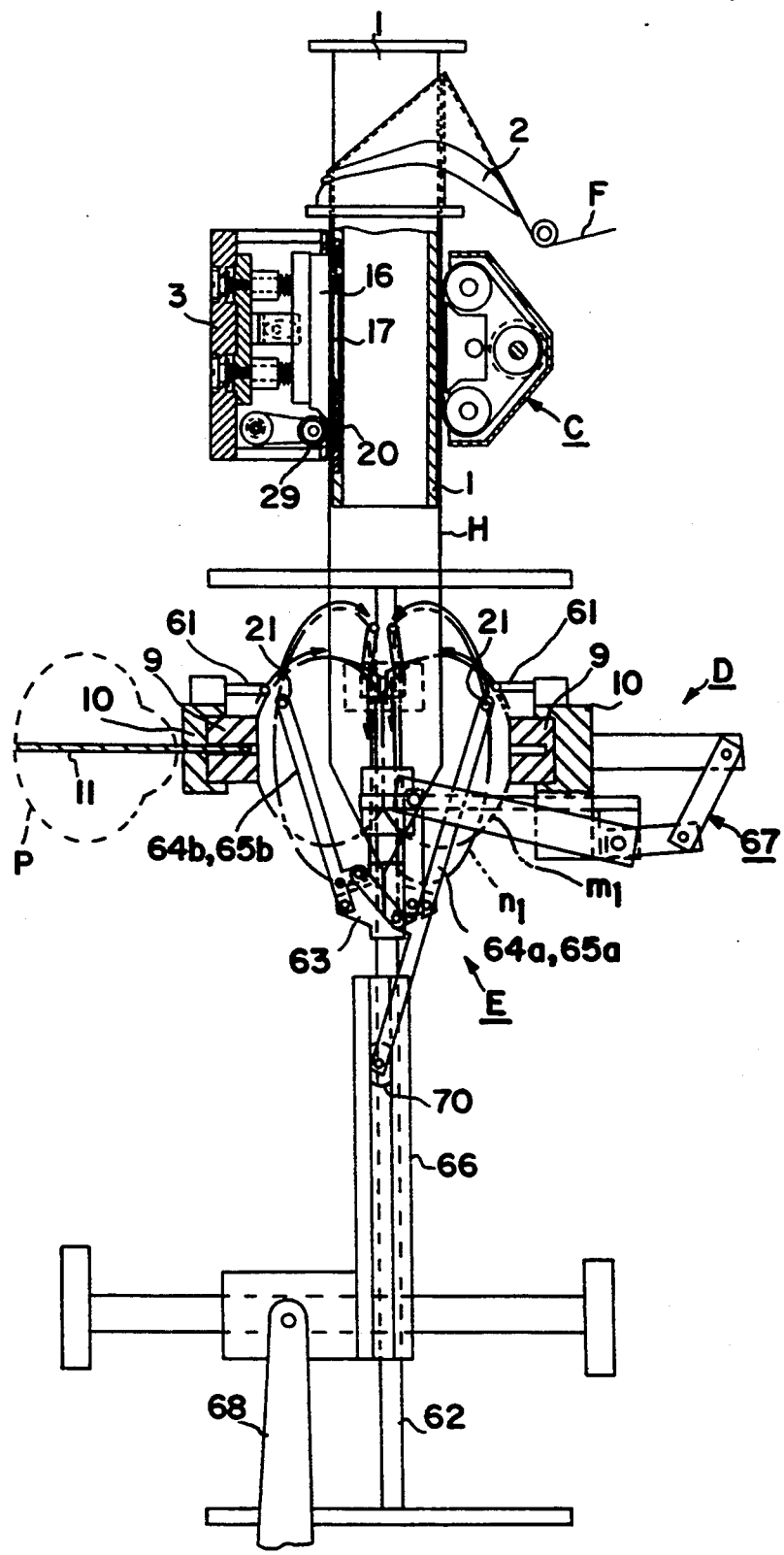
FIG. 11 is a schematic side view showing the whole body when the longitudinal box-making, filling and packaging machine according to the second invention of the present application is not engaged in a lateral seal.
Figure 12:
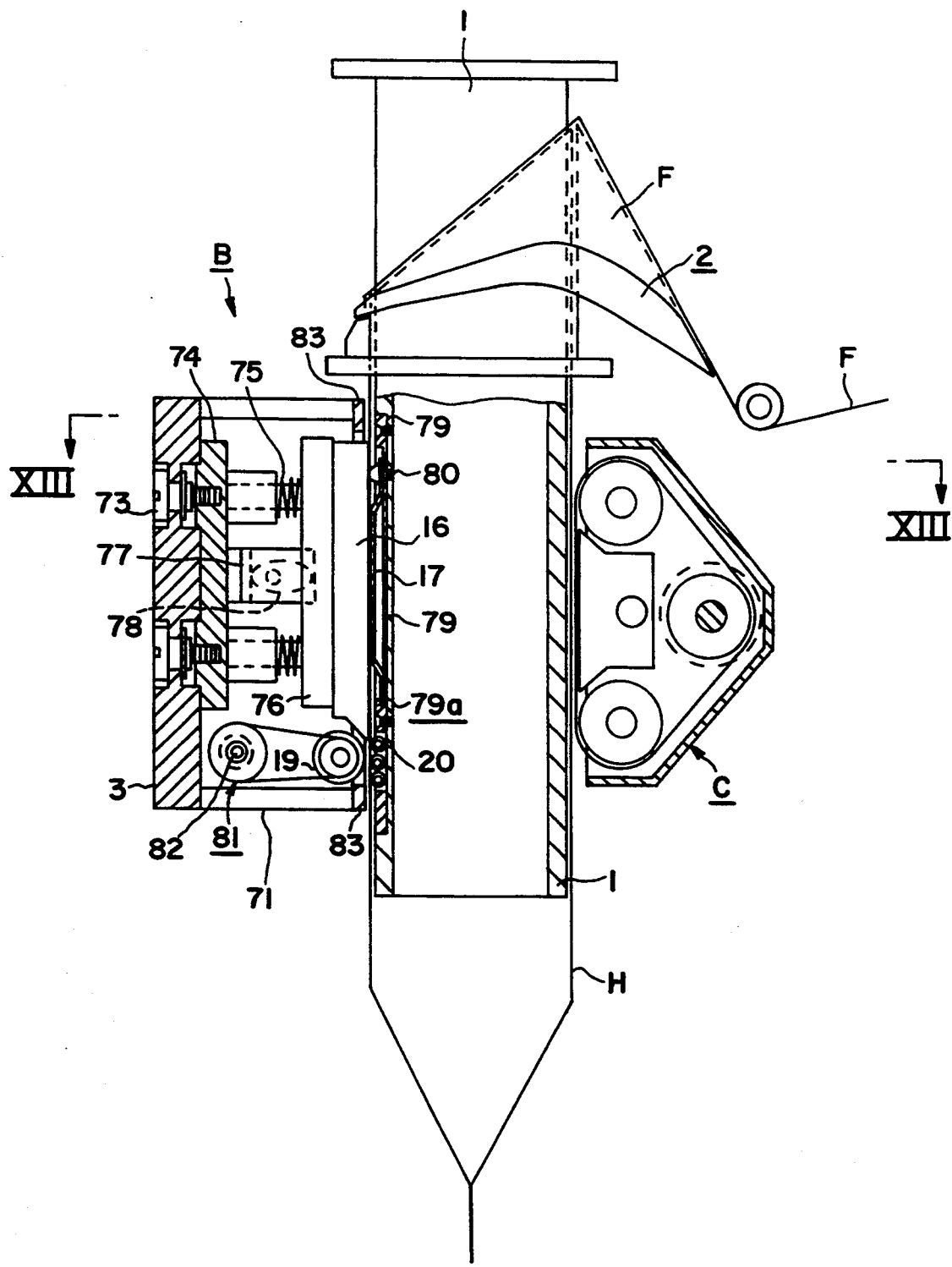
FIG. 12 is a side view showing essential parts of the longitudinal box-making, filling and packaging machine shown in FIG. 11.
Figure 13:
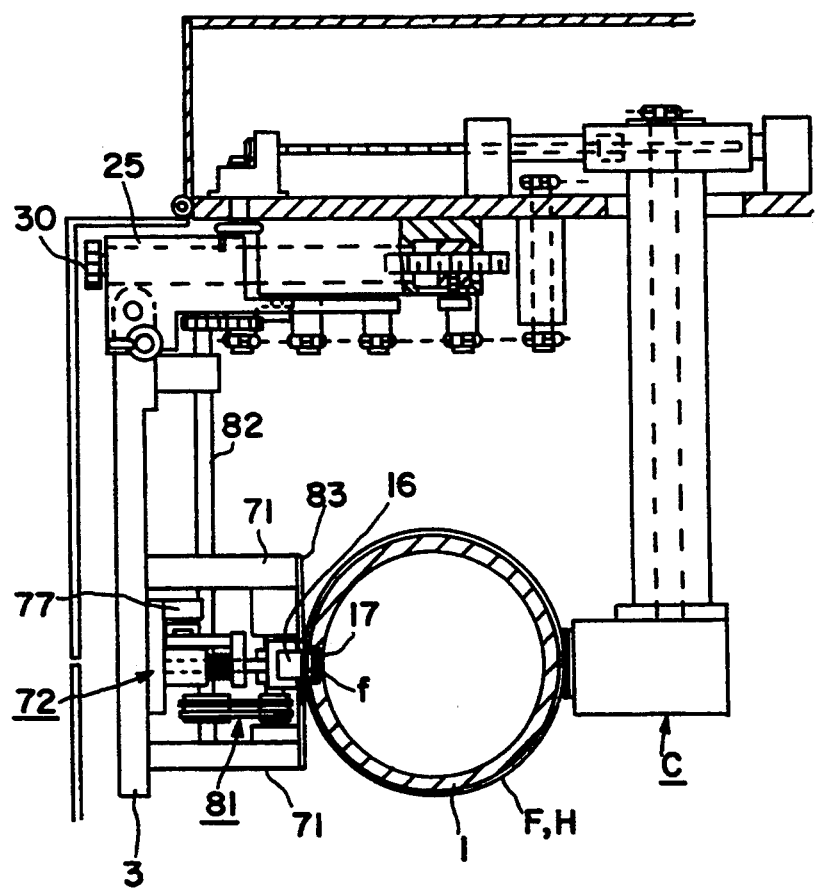
FIG. 13 is a horizontal sectional view taken on line XIII—XIII in FIG. 12.

The longitudinal bag-making, filling and packaging machine according to the second invention of the present application will now be described with reference to FIGS. 11, 12 and 13. This longitudinal bag-making, filling and packaging machine comprises the product falling and filling tube 1, the bag-making device 2, the lateral seal device B, the film feed device C, the lateral seal cutting device D and the packaging tube flattening device E, similar to the embodiment of the first invention. In this longitudinal bag-making, filling and packaging machine, only the longitudinal seal device B is different from the longitudinal seal device A according to the embodiment of the first invention. The difference between the longitudinal seal device B and the longitudinal seal device A is that in the longitudinal seal device A, the end edges f of the packaging film F are stood upright and superposed in a rib-like manner in front of the product falling and filling tube 1, and the film end edges are sandwiched between the pair of heaters so as to continuously effect the longitudinal seal, whereas in the longitudinal seal device B, the end edges f of the packaging film F are superposed before and behind in front of the product falling and filling machine 1, and the film end edges are sandwiched between the heaters and the product falling and filling tube 1 so as to effect the longitudinal seal. The same structural parts of this embodiment as those of the embodiment of the first invention are indicated by the same reference numerals and will not be further described.

In the longitudinal seal device B, the end edge f of the packaging film F is pressed by a single rod-like longitudinal heater 16 and an arch-like film pressing plate spring 17 mounted on the surface of the product falling and filling tube 1, and rolled by a film feed roll 19 close to during the packaging operation in the vicinity of the lower side thereof and transmitted in power through a lower power transmission mechanism 7 mounted on the horizontal pivoted arm 3 and a floating roll 20 mounted on the outer surface of the product falling and filling tube 1. The longitudinal heater 16 cooperates with the film pressing plate spring 17 to slidably hold the packaging film therebetween to heat the packaging film F to a temperature capable of being deposited. A film keep plate 83 secured to the end of a heater bracket 71 is a substantially rectangular plate having a longitudinal slit, the longitudinal heater 16 and the film feed roll 19 being opposed to and placed in contact with the product falling and filling tube 1 from said slit, the film keep plate 83 serving to keep the end edge f of the packaging film F so that the latter is in close contact with the product falling and filling tube 1. The film pressing plate spring 17 is a member essential for the longitudinal heater 16 to obtain an adequate pressing force with respect to the packaging film F. The film feed roll 19 cooperates with the floating roll 20 to draw the packaging film F and to pressure seal the end edges f of the packaging film F heated to a temperature capable of being deposited by the longitudinal heater 16. The floating roll 20 is a member essential for the packaging film F to effect the drawing effectively and smoothly.

The longitudinal heater 16 is mounted on a composite bracket 72 provided on the heater bracket 71 and is vertically lengthy and confronted to the end edge f of the packaging film F superposed before and behind in front of the product falling and filling tube 1. The composite bracket 72 comprises a mounting base plate 74 capable of being fine-adjusted in position with respect to the horizontal pivoted arm 3 by tightening adjusting bolts 73, 73, and a driven plate 76 guided by the mounting base plate 74 and urged by a spring 75 in a direction close to the product falling and filling tube 1 to support the longitudinal heater 16. The driven plate 76 is free to move to and away from the product falling and filling tube 1 by rotation of an elliptic cam 78 secured to the output shaft of the actuator 77 mounted on the mounting base plate 74.

The actuator 77, when the film feed starts, causes the elliptic cam 78 to rotate by 180° and cooperates with the spring 75 to move the driven plate 76 close to the product falling and filling tube 1 and to urge the longitudinal heater 16 against the film pressing plate spring 17. When the film feed stops, the elliptic cam 7B is further rotated by 180° to move the driven plate 76 away from the project falling and filling tube 1 and to move the longitudinal heater 16 away from the film pressing plate spring 17.

The film pressing plate spring 17 comprises a web-like plate spring made of stainless or made of spring steel coated with fluorine plastic or teflon resin. The film pressing plate spring 17 is fitted into a longitudinal groove 1a formed in the product falling and filling tube 1 and fixed by a plate spring mounting appliance 79 having upper and lower ends fixed by screws. The plate spring mounting appliance 79 is fixed such that the lower end of the film pressing plate spring 17 is inserted into and held at an insert hole 79a provided at the lower portion thereof and a screw 80 is inserted into a slot formed in the upper end of the film pressing plate spring 17 with the middle portion of the film pressing plate spring 17 curved arc-wise, which can be adjusted in degree of curve. Three floating rolls are provided at the lower portion of the plate spring mounting appliance 79.

The film feed roll 19 is made of urethane rubber and provided by the heater bracket 71 in proximity of the lower side of the longitudinal heater 16. The mechanism for transmitting the turning power to the film feed roll 19 includes a wrapping device 81 comprising a small rope wheel, a large rope wheel and an endless rope so that the turning power is transmitted to the wrapping device 81 through a transmission shaft provided along the horizontal pivoted arm 3. The power transmission mechanism 18 from a power source to the transmission shaft 82 has the same construction as that of the lower power transmission mechanism 7 of the embodiment of the first invention. The adjustment of the film feed roll 19 and the floating roll 20 is made by the fine adjustment of the slider 25, but preferably, the film feed roll 19 is designed so that it can be shifted. The packaging film F is rolled by the film feed roll 19 and the floating roll 20 because of preventing wrinkles from occurring in the end edge f of the packaging film F at the longitudinal heater 16 rendering the sliding of the film impossible and because of heating to a deposition temperature at the longitudinal heater 16 and applying a rolling pressure to provide a complete deposition seal.

The operation of the embodiment of the second vent;ion according to the present application constructed as described above will now be briefly described hereinbelow. The packaging film F is passed so as to wrap the product falling and filling tube 1 by the bag-making device 2, the horizontal pivoted arm 3 is closed to force-in the slider 25, and the end edge f of the packaging film F is urged against the project falling and filling tube 1 by the film keep plate 83. Then, the film feed roll 19 cooperates with the floating roll 20 to sandwich the packaging film F therebetween. When the packaging operation starts, the film feed device C continuously feeds the packaging film F, the driven plate 76 of the composite bracket 72 moves close to the product falling and filling tube 1, the longitudinal heater 16 presses the web pressing plate spring 17 so that the intermediate portion thereof is flex and deformed into a straight line and the film feed roll 19 cooperates with the floating roll 20 to hold and draw the packaging film F. Accordingly, the end edge f of the packaging film F is pressed for a given section by the longitudinal heater 16 and the film pressing plate spring 17, and heated to a temperature capable of being deposited by the longitudinal heater 16. The end edge f then slidably passes while being subjected to weal pressure seal, and is then sandwiched between the film feed roll 19 and the floating roll 20 and subjected to pressure seal, thus providing a heat seal without wrinkles on the sealed surface. In this manner, the packaging film F is subjected to the longitudinal seal to form a packaging tube H, which is delivered downward. The packaging tube H is filled with a predetermined quantity of articles to be packaged at regular intervals through the produce falling and filling tube 1. The lateral seal cutting device D applies two strips of lateral seal to the desired upper portions of the article to be packaged of the packaging tube H and cuts the portion between the two strips of lateral seal. The operation and function of the pair of lateral heaters 9, 9 and the pair of drawing rods 21, 21 are the same as those described in the embodiment of the first invention according to the present application, description of which will not be made.

If the temperature of the longitudinal heater 16 is excessively high or low, the temperature thereof is adjusted. If the temperature of the longitudinal heater 16 is adequate but the heating time is so short as not to reach the deposition temperature and the pressure seal is insufficient, the composite bracket 72 is adjusted. When the length of the straight-line contact portion of the longitudinal heater 16 and the film pressing plate spring is increased, the heating time can be substantially prolonged delicately and proportionally to heat the packaging film F to the deposition temperature delicately corresponding to the thickness and kinds of the packaging film F. Moreover, the pressing force can be increased delicately and proportionally so that the pressure seal can be carried out satisfactorily. Further, when the temperature of the longitudinal heater 16 is adequate but the pressure seal is excessively carried out, the composite bracket 72 is adjusted to decrease the length of the straight-line contact portion of the longitudinal heater 16 and the film pressing plate spring 17. Then, the heating and deposition time becomes short delicately, and the pressure seal is carried out satisfactorily.

Effect of the Invention

As described above, according to the longitudinal bag-making, filling and packaging machine of the first invention of the present application, the end edges of the packaging film superposed in a rib-like fashion are heated over the lengthy range to secure the heating capability whereas the heating capacity can be substantially adjusted delicately and proportionally while maintaining the temperature of the longitudinal heater at an adequate temperature. Therefore, the deposition temperature of the longitudinal heater can be adequately controlled, and even if the kinds and the feed speed of the packaging film are different, the adjustment can be made delicately accordingly, the packaging films can be continuously fed and the longitudinal seal can be done satisfactorily. Furthermore, the noises and vibrations of the machine can be considerably reduced, and the high-speed packaging can be accomplished.

Further, according to the longitudinal bag-making, filling and packaging machine of the second invention of the present application, an arrangement is selected, as a standard, which requires much heat transmission capacity because of the large thickness of the packaging film and high deposition temperature, and the temperature of the longitudinal heater and the temperature of the heater roll are controlled corresponding to the kinds of the packing films and the film feed speed while maintaining the gap between the longitudinal heaters to be as small as possible to a degree that will not impede the film feed, whereby the heat transmission capacity of the heaters can be set to the adequate magnitude as required. When the heat transmission capacity need be minimized delicately because of the small thickness of the packaging film or the low deposition temperature, it will not sufficient to merely vary the temperature of the heaters in some cases, in which case, therefore, the fine adjustment is made so as to increase the gap between the longitudinal heaters, as required, whereby the heat transmission capacity can be delicately minimized without varying the heater temperature. In this manner, it is possible to easily control the temperature of the heaters and the heat transmission capacity according to the need, thus providing a satisfactory longitudinal seal.

According to the longitudinal bag-making, filling and packaging machine of the first and second inventions of the present application, the lateral heaters effect the box motions at a high speed to provide a lateral seal, thus obtaining a powerful lateral seal.

Moreover, according to the longitudinal bag-making, filling and packaging machine of the first and second inventions of the present application, there is provided a packaging tube flattening device for effecting the box motions which can mechanically follow the high-speed box motions of the lateral heaters. Therefore, the device moves up to a position higher than the lateral heaters before the latters are closed to hold the packaging tube therebetween and quickly moves down to retreat the article to be packaged below the lateral heaters to prevent it from being bited and to remove wrinkles from the packaging film, thus realizing a pretty package. Accordingly, in the case where snack cakes such as potato chips are packaged, it is possible to prevent them from being accumulated so high that they are bited in the heaters and to sufficiently cope with the higher packaging speed. Further, in the case where cakes such as chocolate balls are packaged, a quantity for one bag falls in the form of a vertically long distribution. Since the packaging tube flattening device for effecting the box motions capable of coping with the high speed, even if the packaging speed is increased, the cakes which fall while being distributed at the upper position will not be bited by the lateral heaters.

Furthermore, according to the longitudinal, bag-making, filling and packaging machine of the first and second inventions of the present application, the feed of packaging film is a continuous feed, and there are provided a longitudinal heater capable of adequately controlling temperature, a lateral heater device capable of performing a powerful lateral seal and a packaging tube flattening device. Therefore, it is possible to realize a high-speed package with a considerable reduction in noises and vibrations of the machine.

What is claimed is:

1. A longitudinal bag-making, filling and packaging machine, wherein in an outer surface of a product falling and filling tube wrapped by a packaging film folded into a tubular shape by a bag-making device, the packaging film is continuously fed downward by a film feeding device and an edge of the packaging film of which film inner surfaces are superposed each other in a rib-like fashion is held by a longitudinal sealing device provided at the pivot end of a horizontal pivoted arm to longitudinally deposition-seal said end edge to form a packaging tube, an article to be packaged supplied through said product falling and filling tube is filled into a packaging tube and hung down from the product falling and filling tube, and upper and lower portions of the article to be packaged of said packaging tube are laterally deposition-sealed into two strips by a lateral sealing and cutting device and the sealed portion of said two strips is cut, characterized in that:

said longitudinal sealing device comprises: a pair of rod-like longitudinal heaters, a pair of film draw-in rolls, a front edge of said packaging film superposed in a rib-like fashion is sandwiched between said pair of film draw-in rolls for drawing-in said front edge and guiding said front edge into slidable close contact between said pair of rod-like longitudinal heaters, a pair of heater rolls for sandwiching therebetween said front edge and roll sealing said front edge while feeding the film at a rate greater than the draw-in rate of the film draw in roll, and an upper and lower power transmission mechanism mounted on said horizontal pivot arm for respectively driving said film draw-in rolls and said heater rolls;

said sealing and cutting device comprises: a pair of lateral heater mounting plates, a lateral heater provided on each of said pair of lateral heater mounting plates, annular grooved cams, cam engagement rods provided at both ends of each of said lateral heater mounting plates, said cam engagement rods engaging with said annular grooved cams, and a pivot lever which extends through said annular grooved cams for turning said cam engagement rods, whereby the lateral heater mounting plates are moved upward in the state where a pair of lateral heaters are opened, at which up position the mounting plates are registered with register marks printed on the packaging film and closed to provide a deposition seal for lateral two strips, and the lateral heater mounting plates move down a predetermined distance in synchronism with the film rate, at which down position the lateral heater mounting plates are opened to avoid interference with the article to be packaged so as to perform a pair of symmetrical box motions and is moved up and returned; and the lateral sealing and cutting device further comprises: a packaging tube flattening device comprising a pair of horizontal and parallel drawing rods operatively connected to the box motion of the lateral heater mounting plates to effect a pair of longitudinal box motions between the lateral heaters when the lateral heaters are opened and move upward to a position higher than an initial position of the lateral heaters to hold the packaging tube therebetween and move downward to flatten the packaging tube over the required length.

2. A longitudinal bag-making, filling and packaging machine, wherein in an outer surface of a product falling and filling tube wrapped by a packaging film folded into a tubular shape by a bag-making device, the packaging film is continuously fed downward by a film feeding device and an end edge of the packaging films superposed before and behind is held by a longitudinal sealing device provided at the pivot end of a horizontal pivoted arm to longitudinally deposition-seal the end edges together of the packaging film to form a packaging tube, and upper and lower portions of the article to be packaged of said packaging tube are laterally deposition-sealed into two strips by a lateral sealing and cutting device so as to cut the sealed portion of said two strips, characterized in that:

said longitudinal sealing device comprises: a rod-like longitudinal heater and an arch-like film pressing plate spring mounted on the outer surface of said product falling and filling tube for pressing a front edge of said packaging film, a film feed roll for rolling the front edge of the packaging film, a lower power transmission mechanism for driving said film feed roll which moves closer during the packaging operation and is mounted on the horizontal pivoted arm and a floating roll cooperating with said feed roll mounted on the outer surface of the product falling and filling tube;

said sealing and cutting device comprises: a pair of lateral heater mounting plates, a lateral heater provided on each of said pair of lateral heater mounting plates, annular grooved cams, cam engagement rods provided at both ends of each of said lateral heater mounting plates, said cam engagement rods engaging with said annular grooved cams, and a pivot lever which extends through said annular grooved cams for turning said cam engagement rods, whereby the lateral heater mounting plates are moved upward in the state where a pair of lateral heaters are opened, at which up position the mounting plates are registered with register marks printed on the packaging film and closed to provide a deposition seal for lateral two strips, and the lateral heater mounting plates move down a predetermined distance in synchronism with the film rate, at which down position the lateral heater mounting plates are opened to avoid interference with the article to be packaged so as to perform a pair of symmetrical box motions and is moved up and returned; and the lateral sealing and cutting device further comprises: a packaging tube flattening device comprising a pair of horizontal and parallel drawing rods operatively connected to the box motion of the lateral heater mounting plates to effect a pair of longitudinal box motions between the lateral heaters when the lateral heaters are opened and move upward to a position higher than an initial position of the lateral heaters to hold the packaging tube therebetween and move downward to flatten the packaging tube over the required length.

* * * * *